United States Patent [19]
Kushmuk

[11] Patent Number: 4,462,475
[45] Date of Patent: Jul. 31, 1984

[54] WEIGHING SCALE
[75] Inventor: Walter P. Kushmuk, Niles, Ill.
[73] Assignee: Continental Scale Corporation, Bridgeview, Ill.
[21] Appl. No.: 411,654
[22] Filed: Aug. 26, 1982

Related U.S. Application Data
[63] Continuation-in-part of Ser. No. 057,906, Jul. 16, 1979, abandoned.

[51] Int. Cl.³ .................. G01G 23/14; G01G 21/28; G01G 21/08
[52] U.S. Cl. .................................. 177/173; 177/239; 177/256
[58] Field of Search ............... 116/294, 297, 304, 334, 116/335; 177/159, 167, 168, 169, 170, 173, 225, 229, 238, 239, 256, 262

[56] References Cited
U.S. PATENT DOCUMENTS

| | | | |
|---|---|---|---|
| 2,232,830 | 2/1941 | Sutton | 177/169 |
| 3,040,698 | 6/1962 | Gray | 116/304 |
| 3,250,339 | 5/1966 | Ruskin | 177/169 |
| 3,298,351 | 1/1967 | Koza | 116/334 |
| 3,464,509 | 9/1969 | Gray | 177/256 |
| 3,741,325 | 6/1973 | Stube et al. | 177/170 |
| 3,759,338 | 9/1973 | Petersen et al. | 177/173 |
| 3,894,591 | 7/1975 | Ackeret | 177/173 |
| 4,030,559 | 6/1977 | Fish et al. | 177/169 |

FOREIGN PATENT DOCUMENTS
0293467 9/1953 Switzerland ............ 177/170

Primary Examiner—E. A. Goldberg
Assistant Examiner—Patrick W. Foster
Attorney, Agent, or Firm—Richard L. Johnston

[57] ABSTRACT

A weighing scale is provided in which a horizontally disposed weighing platform contains a weighing scale dial on a side of said platform so that it can be read both from directly above and from the side, and means for transmitting weight response from a weighing mechanism mounted beneath said platform to said dial.

5 Claims, 9 Drawing Figures

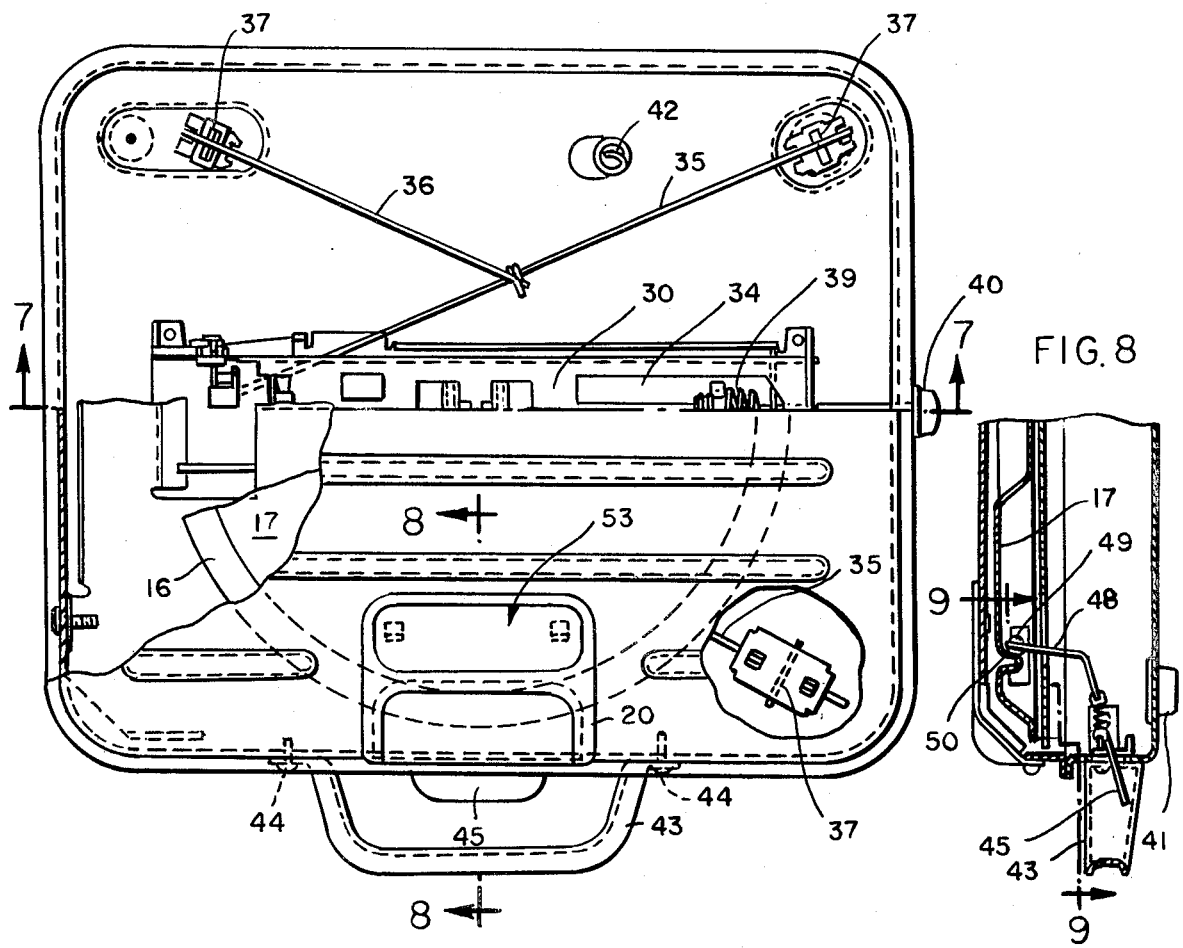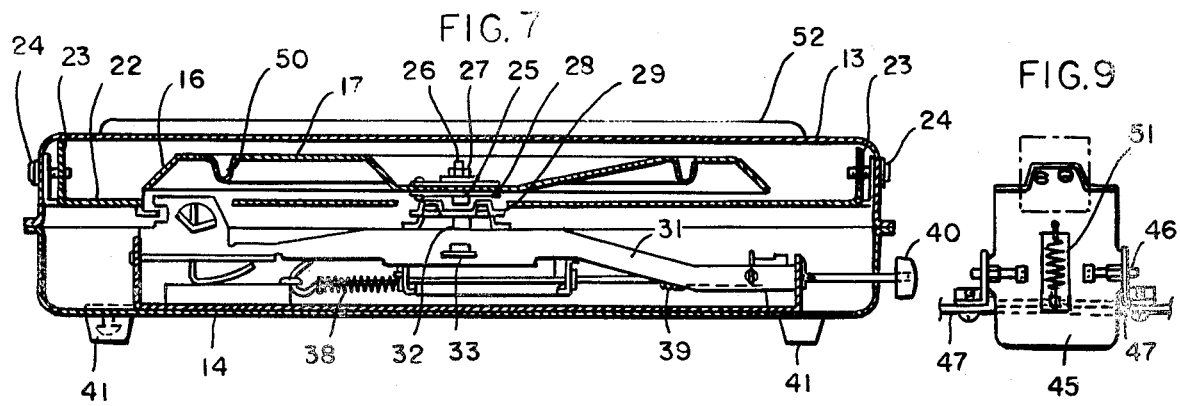

WEIGHING SCALE

RELATED APPLICATIONS

This application is a continuation-in-part of U.S. application Ser. No. 06/057,906, now abandoned, filed July 16, 1979.

BACKGROUND

Many different types of weighing scales are known in which objects to be weighed are placed on a platform and the weight is recorded on a dial which is in said platform as, for example, in U.S. Pat. No. 3,243,002, or where the dial from which the weight is read is on the side of a supporting structure as, for example, in U.S. Pat. Nos. 2,066,624, 2,287,814, 2,408,942, 2,420,639 and 3,592,277.

Under some circumstances it is desirable to read the dial of the weighing scale directly from above as well as from the side even when the normal weighing surface is covered by the object to be weighed. Thus, in the case of a bathroom type scale such as shown in U.S. Pat. No. 3,243,002, it is possible for a person standing on the scale to read the dial from above but the dial could not be read if the weighing surface or platform were covered with an object or package to be weighed.

Personal weighing scales are also known where the dial is mounted independently of the platform on a post or other superstructure but such scales are more costly to manufacture.

Many other types of scales are known such as beam scales which are relatively expensive to manufacture as illustrated, for example, by U.S. Pat. No. 3,743,040.

There is a need for readily portable weighing scales which are relatively small and compact and which can be read from above or the side when a package or other object is placed on the weighing surface of the weighing platform so that it would or could cover said surface. A specific example of this is where a weighing scale is used to monitor the contents of a vessel or container, the contents of which are being withdrawn or allowed to escape as, for instance, cylinders of oxygen or other gases.

BRIEF SUMMARY OF THE INVENTION

In accordance with the invention a weighing scale is provided in which a horizontally disposed weighing platform contains a weighing scale dial mounted on a side of said platform so that it can be read both from directly above and from the side, and means for transmitting weight response from a weighing mechanism mounted beneath said platform to said dial.

DETAILED DESCRIPTION OF THE INVENTION

The practice of the invention is illustrated in the drawings and the accompanying description wherein one mode of practicing the invention is shown in FIGS. 1 to 4 and a second mode is illustrated in FIGS. 5 to 9:

FIG. 6 is a plan view with parts broken away of the scale shown in FIG. 5;

FIG. 7 is a sectional view taken along the lines 7,7 of FIG. 6 and is also a sectional view taken through the center of the scale shown in FIG. 5;

FIG. 8 is a partial sectional view taken along the lines 8,8 of FIG. 6 and illustrating a mechanism for stopping the rotation of the dial; and FIG. 9 is a view taken along the line 9,9 of FIG. 8.

Figure 1:
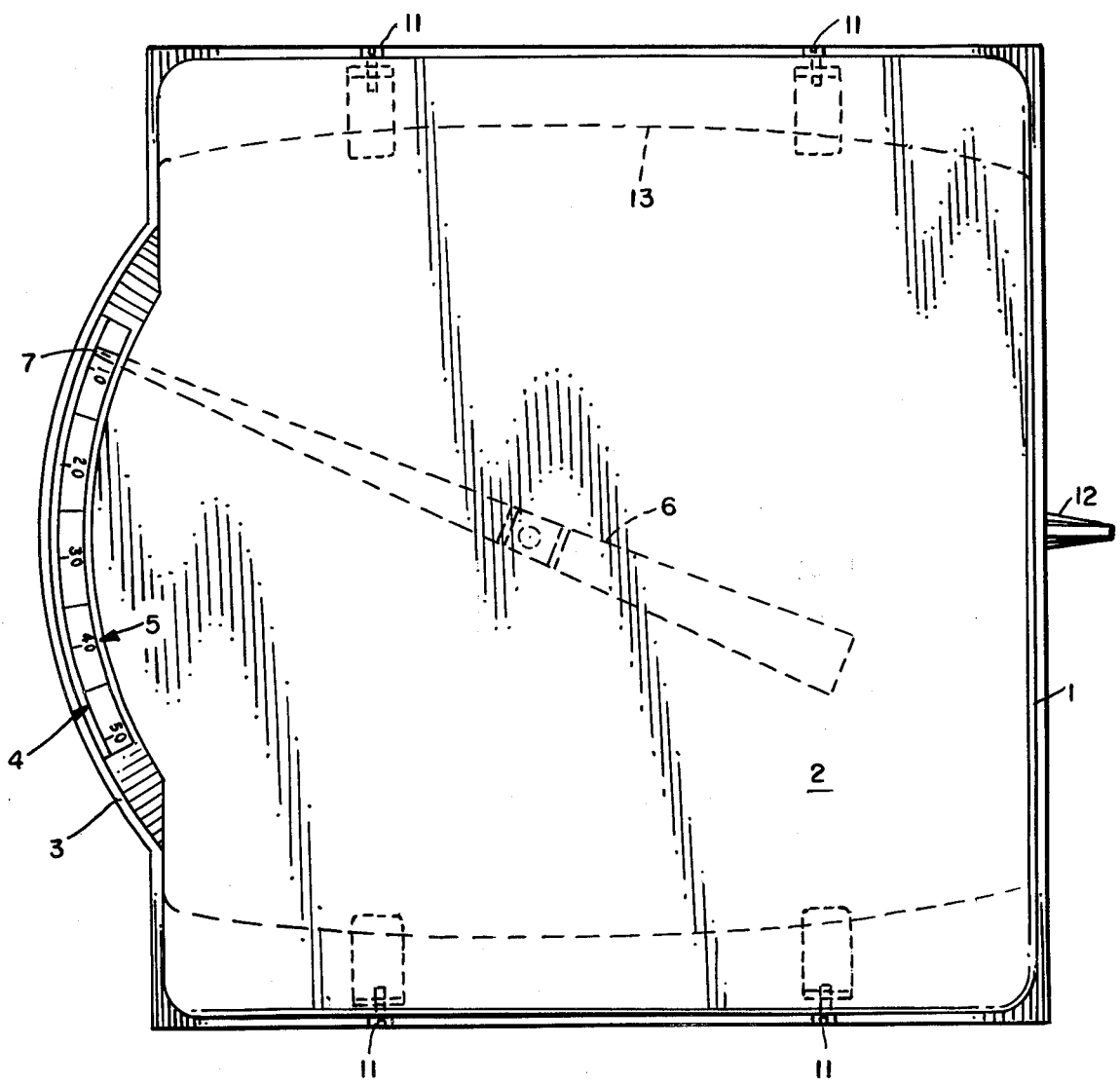
FIG. 1 is a plan view of a weighing scale provided in accordance with the invention.

In general, the weighing scale shown in the drawings comprises:

(a) a horizontally disposed weighing platform having an upper weighing surface area adapted to receive a package or other object to be weighed;

(b) a weighing mechanism mounted beneath said platform and responsive to weight supplied to said platform, (c) a weighing scale dial mounted on a side of said platform and containing weight indicia which can be read from above and/or the side, and (d) means for transmitting weight response from said weighing mechanism of (b) to said dial of (c), whereby weight in terms of the indicia on said dial can be read from above and/or on a side.

As shown by the drawings, a horizontally disposed weighing platform 1 has an upper weighing surface area 2 adapted to receive a package or other object to be weighed and an outwardly extending side 3 extending beyond said weighing surface.

A weighing mechanism, not shown, is mounted beneath said platform 1 and is responsive to weights supplied to said platform. The weighing mechanism is conventional and may be of the type disclosed in U.S. Pat. No. 3,193,034, the disclosure of which is incorporated herein and made a part hereof.

The outwardly extending side 3 of said platform contains a dial generally indicated at 4 bearing weight indicia generally indicated at 5.

The means for transmitting weight response from the weighing mechanism to the dial is a readable pointer 6 which is mounted for rotation by the weighing mechanism with the outer end 7 describing an arc in juxtaposition to the dial 4 whereby weight in terms of the indicia 5 on said dial can be read with respect to the position of the end of said pointer when viewed from above and/or from the side.

Figure 2:
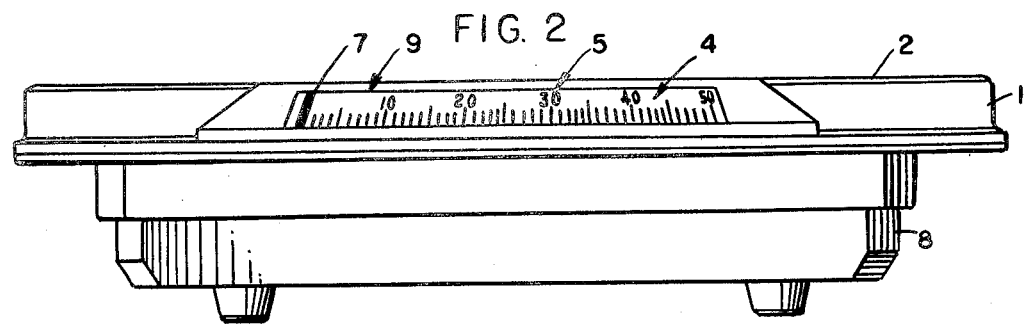
FIG. 2 is an end view of one side of said scale.
Figure 3:
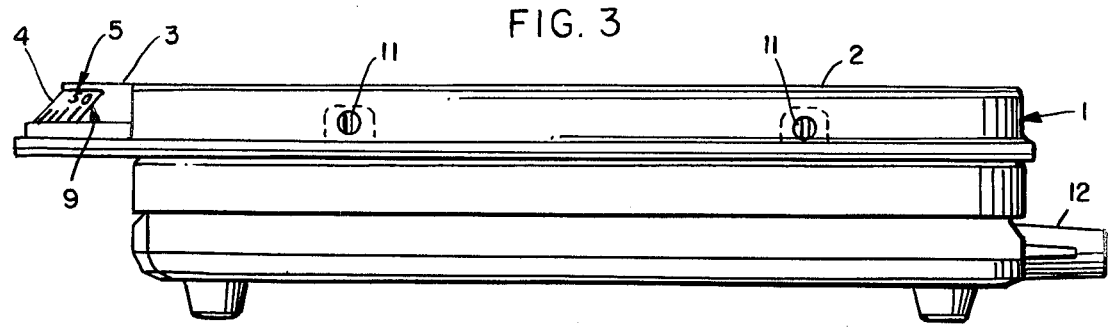
FIG. 3 is a side view taken at an angle of 90° from the side shown in FIG. 2.
Figure 4:
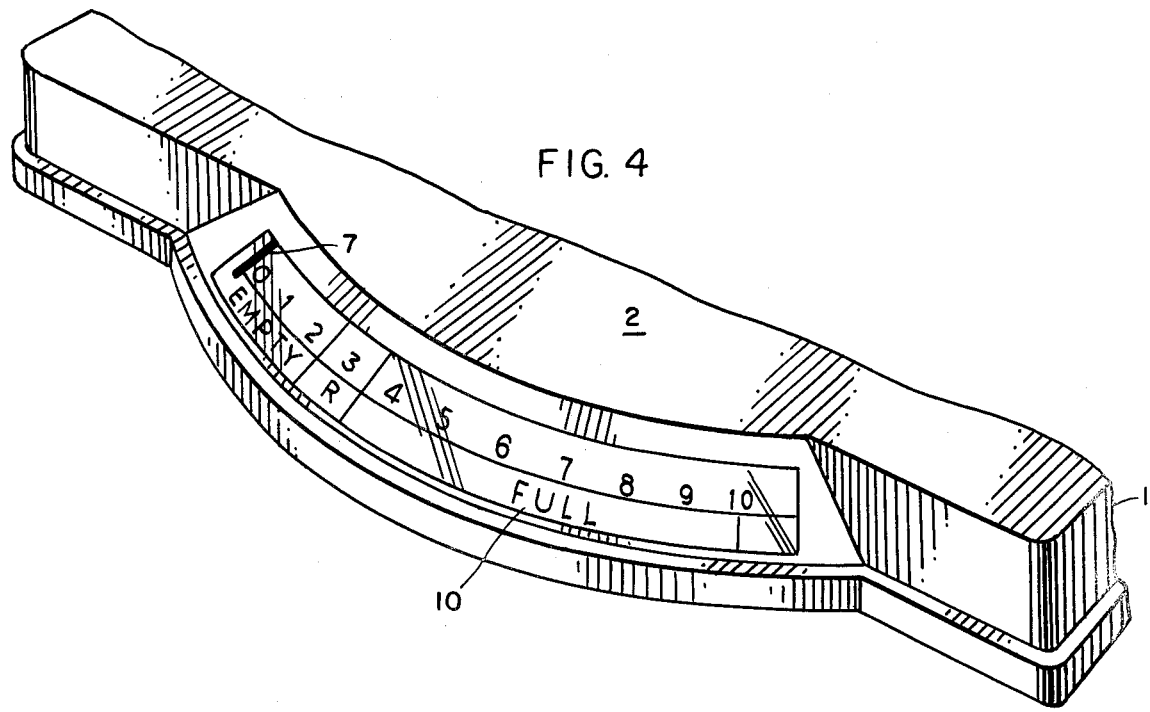
FIG. 4 is a perspective view illustrating a modification of the dial shown in FIGS. 1, 2 and 3.
Figure 5:
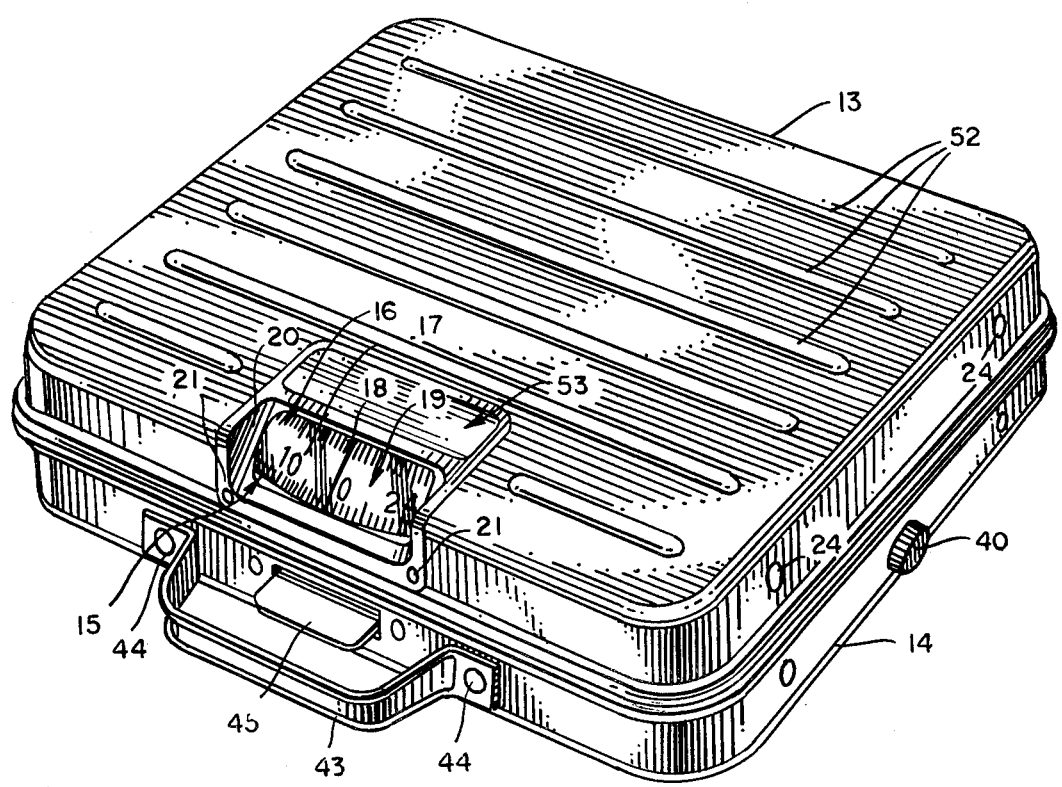
FIG. 5 is a perspective view of a weighing scale illustrating a second mode of practicing the invention.

The weighing mechanism and platform are supported by a support frame 8 of a conventional type. As will be seen in FIG. 2 the dial can be in the form of a plastic strip which is secured in an opening 9 in the outwardly extending side 3 and the pointer end 7 moves in an arcuate path on the inside of said plastic strip. The plastic strip contains the indicia 5 or other types of indicia 10 such as shown in FIG. 4.

The pointer end 7 is bent so as to substantially coincide with the inside of the dial 4 which is preferably made of clear plastic. The pointer end 7 also has a contrasting color with respect to the indicia, numerals and lines, as well as the background so that the movement of the pointer end 7 is plainly visible when the dial 4 is viewed from above and from the side.

The opening 9 in which the dial 4 is positioned is so constructed that the dial is at an angle or oblique with respect to the horizontal, preferably an angle of approximately 30°–45°. Thus, the indicia contained in the dial are plainly visible from above and the side even when the rectangular portion of the weighing platform surface 2 is covered by a package, a cylinder or other object. The dial can also be horizontal facing upward so it can be read only from above or facing downward if the scale is mounted in an elevated position and the dial is read from below, or vertical if the dial is read only from the side.

The weighing platform 1 is secured to the weighing mechanism by bolts or screws 11. The weighing mechanism also contains a zero adjusting knob 12. The upper part of the lower supporting structure is indicated by dotted lines 13. These elements and the supporting structure are shown merely to provide a general understanding of the structure and do not constitute a critical part of the invention. Other types of weighing mechanism can be employed including electrical types with digital readouts on the dial.

The indicia 5 on the dial 4 can be calibrated in any suitable measurements, as, for example, ounces, pounds, grams, and kilograms. The dial can also contain other explanatory indicia as shown in FIG. 4 such as "Empty" and "Full" where the scale is used for a specific purpose. Thus, in FIG. 4 the scale is especially adapted for use where an oxygen tank or any other type of gas cylinder is disposed on the weighing surface 2 and the indicia on the dial are arbitrarily calibrated to indicate the relative amount of liquid or liquefied gas in the cylinder disposed on the weighing surface 2. As shown in FIG. 4 a cylinder disposed on the weighing surface 2 would be "Full" when the pointer end 7 is opposite the indicia 10. As the contents of the cylinder are removed the pointer would move from 10 toward zero. The practical operating range is represented by the legend "Full". When the pointer reaches the letter "R" the operator would be on notice that the contents are approaching "Empty" in the range of 0-2.

In the second mode of practicing the invention a different structural arrangement is employed wherein the platform 13 is mounted on a base structure 14 and the dial 15 is disposed in one side of the platform 13 in a slanted or oblique position so that the weight indicia mounted on the slanted or oblique side 16 of rotatable disc 17 can be read both from the side and from above with respect to a center line or mark 18 in the face of a transparent glass or plastic cover 19 mounted in a frame 20 which in turn is mounted on one side of platform 13 by means of screws 21,21 or in any other suitable manner.

The structural arrangement in the weighing scale illustrated in FIGS. 5 to 9 is essentially different from that employed in conventional weighing scales in that a circular dial 17 is mounted on an intermediate platform 22 which has upwardly extending sides 23 which support the weighing platform 13 on all four sides and are connected to the weighing platform 13 by means of screws 24.

The circular dial 17 is centrally mounted by means of an opening therein having peripheral teeth which engage a pinion 25 mounted on a shaft 26 and secured thereto by a nut 27. Pinion 25 is supported by a bearing structure 28 and pinion 25 is held in place by retaining member 29. Bearing structure 28 is secured in any suitable manner by rivets or otherwise to a raised structure 30 (see FIG. 6) which extends over brace 31. A second pinion 32 mounted on a shaft 26 and pinion bearing 33 is actuated by a rack 34 in response to movement of two long levers 35 and two short levers 36 connected to the four lever pivots 37 on the four corners of the scale. The movement of the rack in the rack and pinion structure is balanced by springs 38 and 39 and the spring tension for zero positioning can be adjusted by turning adjusting knob 40. The base 14 rests on four feet 41. A pair of springs 42 on opposite sides of the scale secure the intermediate platform 22 to the base 14. A handle 43 is secured to the base 14 by means of screws 44.

In order to stop the dial in any predetermined position a stop mechanism is provided as shown in FIGS. 8 and 9 which consists of a lever 45 mounted on a shaft 46 which in turn is mounted in a pair of brackets 47. The brackets 47 are attached to the upwardly extending side of the base by screws or any other suitable means. Lever 45 has an upwardly extending arm 48 on the end of which is a rubber knob 49 adapted to engage an upwardly extending portion 50 of rotating disc 17. A spring 51 maintains lever 45 in a normally up position so that knob 49 does not normally engage dial disc 17. When lever 45 is pressed downwardly as shown in FIG. 8 the mechanism is over-balanced and spring 51 holds knob 49 against the downwardly projecting portion 50 of disc 17 so as to maintain the dial in any predetermined position.

Stated in another way, when the spring 51 is below the pivot it exerts a torque toward the dial so that the knob 49 engages the portion 50 of the dial disc 17, thereby stopping the disc in a predetermined position, and when the spring 51 is above the pivot it exerts torque away from said disc so that it no longer engages said disc when the lever 45 is pulled to the up position.

Ribs 52 serve to improve the appearance of the weighing platform 13 and at the same time provide runways or guides which facilitate the placing and removal of packages. A space 53 is provided on the upper part of frame 20 to permit insertion of a name plate.

In the embodiment described in FIGS. 5 to 9, the portion of the weighing mechanism on which the intermediate platform 22 is supported including the pivots 37, the long arms 35, the short arms 36 and the rack and pinion mechanism, as well as the zero adjusting knob 40, are conventional. The intermediate platform 22 and the configuration of the retaining disc 17 with the slanged side 16, as well as the retention mechanism shown in FIGS. 8 and 9 are novel. The indicia which are applied to the slanting side 16 of rotating disc 17 can be varied and the movement of the rotating disc can be adjusted in order to weigh packages or objects within predetermined weight limits.

By way of further explanation it may be pointed out that applicant's invention constitutes an improvement on U.S. Pat. No. 3,193,034 wherein the weight responsive mechanism is in a base structure having a substantially horizontal bottom, upwardly extending sides and an open top and said weight responsive mechanism consists essentially of four levers on which four rectangular spaced legs attached to the underside of the load bearing surface or platform are supported in knife edge relationship on notches in respective levers and the vertical movement cause by weight of an object placed on the load bearing platform is translated by a rack and pinion mechanism to rotational movement which is imparted to a vertical shaft on which the dial disc is mounted whereby the indicia on the dial disc can be viewed from directly above through a window in the load bearing platform. The operation of the weight responsive mechanism to convert vertical movement to rotational movement of a vertical shaft on which the dial is mounted or on which a pointer is mounted as shown in FIGS. 1-4 is the same except that in the present improvement with respect to the type of scale shown in FIGS. 1-4 and also the type of scale shown in FIGS. 5-9, the pointer, or dial disc, as the case may be, are disposed in a separate compartment or superstructure, the upper surface of which is horizontal and is the lower surface of the load bearing platform, which compartment is also provided with substantial vertical sides and a substantially horizontal lower surface. The compartment also has substantial width and depth sufficient to permit mounting of a pointer or dial adapted to extend to a side of said scale independent of the weight responsive mechanism in the base, except that the vertical rotatable shaft from the weight responsive mechanism in the base extends into said compartment and is connected by a pinion and gear type structure to the pointer or dial disc. Due to this arrangement, it is possible to extend the pointer or dial disc to the side of the scale beyond the legs which would otherwise interfere and it is also possible to provide sufficient depth so that the end of the pointer and the outer surface of the dial disc can be slanted or inclined so as to make it possible to read indicia through a window in the side of the compartment viewed either from above or from the side.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A scale comprising:
   (a) a base structure having a substantially horizontal bottom, upwardly extending sides and an open top,
   (b) a weight responsive mechanism mounted in said base structure of (a) adapted to be activated by vertical movement caused by weight of an object placed on said scale, said mechanism adapted to translate said vertical movement to rotational movement of a vertical shaft mounted on said mechanism,
   (c) a superstructure mounted over said base structure of (a) and supported for floating vertical movement by said weight responsive mechanism of (b), said superstructure comprising an upper surface to receive articles of substantial weight, substantially vertical sides, and a substantially horizontal lower surface, the lower side of said upper surface, said substantially vertical sides and said substantially horizontal lower surface forming a compartment of substantial width and depth sufficient to permit mounting of a pointer or dial disc adapted to extend to a side of said scale independently of said mechanism of (b),
   (d) said vertical shaft of (b) extending through said horizontal lower surface of said compartment of (c) and having a pointer or dial disc mounted therein for rotation in a substantially horizontal plane, the end of said pointer being inclined and the outer surface of said dial disc being inclined with indicia, and
   (e) a window in a side of said compartment of (c) through which the movement of said pointer or the indicia on said dial disc can be observed.

2. A scale as claimed in claim 1 in which (d) comprises a pointer, the end of which is inclined so that it can be viewed through said window of (e).

3. A scale as claimed in claim 1 in which (d) comprises a dial disc the outer surface of which is inclined with indicia thereon so that said indicia can be viewed through said window of (e).

4. A scale as claimed in claim 1 in which (d) comprises a dial disc which has a downwardly projecting portion and manually actuated means mounted on said base structure of (a) operative to engage said downwardly projecting portion of said dial disc and when actuated to stop said disc and maintain it in a predetermined position.

5. In a weighing scale of the type comprising a base structure having a substantially horizontal bottom, upwardly extending sides and an open top, and a weight responsive mechanism mounted in said base structure comprising four levers on which four legs are supported so that weight applied to a load bearing surface is transmitted through said legs to said levers and vertical movement imparted in the mechanism in said base is translated to rotational movement of a vertical shaft operative to drive a pointer or dial disc, the improvement which comprises a superstructure mounted over said base and supported for floating vertical movement by said weight responsive mechanism, the said superstructure comprising an upper surface to receive articles of substantial weight, substantially vertical sides, and a substantially horizontal lower surface, the lower side of said upper surface, said substantially vertical sides and said substantially horizontal lower surface forming a compartment of substantial width and depth sufficient to permit mounted of a pointer or dial disc adapted to extend to a side of said scale independently of said weight responsive mechanism in said base, with said vertical shaft to which rotational movement is applied by said weight responsive mechanism extending through said horizontal lower surface of said compartment and having a pointer or dial disc mounted thereon for rotation in a substantially horizontal plane, the end of said pointer being inclined and the outer surface of said dial disc being inclined with indicia thereon, and a window in a side of said compartment through which the movement of said pointer or the indicia on said dial disc can be observed.

* * * * *